United States Patent [19]

Yano et al.

[11] Patent Number: 4,518,887

[45] Date of Patent: May 21, 1985

[54] DIFFERENTIAL LEVER ACTUATOR INCLUDING DIFFERENTIALLY FORCE-TRANSMITTING MEMBERS WHICH ARE NOT LIABLE TO BREAK

[75] Inventors: Takeshi Yano; Izumu Fukui; Takeshige Hamatsuki; Eiichi Sato; Osamu Inui, all of Tokyo, Japan

[73] Assignee: NEC Corporation, Tokyo, Japan

[21] Appl. No.: 582,667

[22] Filed: Feb. 23, 1984

[30] Foreign Application Priority Data

Feb. 25, 1983 [JP] Japan .................................. 58-30284
Jun. 14, 1983 [JP] Japan .................................. 58-106211
Jul. 21, 1983 [JP] Japan .................................. 58-133340
Oct. 11, 1983 [JP] Japan .................................. 58-189530
Dec. 9, 1983 [JP] Japan .................................. 58-232326

[51] Int. Cl.³ .............................................. H01V 7/00
[52] U.S. Cl. .............................. 310/328; 73/517 AV; 346/139 C
[58] Field of Search .............. 73/517 AV; 267/160; 310/328, 323, 329; 346/139 C, 139 R

[56] References Cited

U.S. PATENT DOCUMENTS 3,649,857 3/1972 Knappe .................................. 310/328
4,104,920 8/1978 Albert et al. ...................... 73/517 AV
4,349,183 9/1982 Wirt et al. .......................... 267/160
4,435,666 3/1984 Fukui et al. ........................ 310/328

*Primary Examiner*—William H. Beha, Jr.
*Assistant Examiner*—D. L. Rebsch
*Attorney, Agent, or Firm*—Sughrue, Mion, Zinn, Macpeak, and Seas

[57] ABSTRACT

In a differential lever actuator comprising transmission members (41, 42) for differentially transmitting oppositely sensed angular displacements from first and second weight points (P1, P3) of first and second lever members (31, 32) to first and second predetermined points (P2, P4) of a differential lever member (41), a distance between midpoints (S, T) between the first weight and predetermined points and between the second weight and predetermined points is kept constant irrespective of the angular displacements. Preferably, at least one transmission member should be perpendicular to a line passing through the related weight point and a fulcrum point (Q or R) of the associated one of the first and second lever members. When carried by the differential lever member for print of a dot, a rod should preferably have an axis passing through a point of intersection of the transmission members. Alternatively, the differential lever member should have a center of a rotational component of the distance ($\overline{ST}$) at a point of percussion related to a reaction resulting from print of the dot. As a further alternative, at least one transmission member should be thicker than 0.05 times a length between the related weight and predetermined points.

12 Claims, 25 Drawing Figures

DIFFERENTIAL LEVER ACTUATOR INCLUDING DIFFERENTIALLY FORCE-TRANSMITTING MEMBERS WHICH ARE NOT LIABLE TO BREAK

BACKGROUND OF THE INVENTION

This invention relates to a differential lever actuator which is useful, among others, in actuating a printing rod of a printing element in a printing head of an impact printer.

A differential lever actuator is described in U.S. patent application Ser. No. 381,479 filed May 24, 1982, now U.S. Pat. No. 4,435,666, by Izumu Fukui et al, assignors to the present assignee. A differential lever actuator comprises a driving member having an axis and a first and a second end transversely of the axis. The driving member is preferably an electroexpansive body of a rectangular prismal shape. At any rate, the first end is fixed to a base or holding member. The second end is susceptible to a linear displacement along the axis. First and second lever members are attached to the base member at first and second fulcrum points, respectively, and to the second end at first and second power points, respectively. The fulcrum and the power points are so called merely because each lever member serves as a lever, as will presently become clear. The lever is for getting a greater displacement from the linear displacement.

First and second plate-shaped resilient transmission members have principal surfaces perpendicular to a reference plane including the axis and the first and the second power points, and are attached to the first and the second lever members at first and second weight points, respectively. A third lever member, which is herein named a differential lever member because of the reason which will shortly become clear, is carried by the first and the second transmission members at first and second predetermined points of the differential lever member, respectively. The first and second lever members give amplified displacements to the respective weight points in opposite senses. The transmission members therefore differentially transmit forces to the differential lever member to give a further, amplified displacement to that end of the differential lever member which is more remote from one of the predetermined points than the other.

In a conventional differential lever actuator, at least one of the transmission members often breaks or is liable to damage, particularly when the differential lever actuator is repeatedly operated many times. It has now been found and confirmed that the breakage results from a complicated deformation to which the transmission member is subjected during operation. Furthermore, the complicated deformation reduces the displacement transmitted to the differential lever member through the transmission member and results in wasteful consumption of energy which would otherwise be effective in actuating the differential lever member. In other words, the complicated deformation not only caused damage to the transmission members, but also adversely affects the efficiency of operation of the differential lever actuator.

SUMMARY OF THE INVENTION

It is therefore an object of the present invention to provide a differential lever actuator in which a pair of differentially force-transmitting members is not complicatedly deformed during operation.

It is another object of this invention to provide a differential lever actuator of the type described, in which either of the force-transmitting members rarely breaks, even during repeated operation.

It is still another object of this invention to provide a differential lever actuator of the type described, in which displacements are effectively transmitted by the force-transmitting members.

It is yet another object of this invention to provide a differential lever actuator of the type described, in which useless consumption of energy is avoided.

It is a further object of this invention to provide a differential lever actuator of the type described, which has excellent efficiency of operation.

A differential lever actuator to which this invention is applicable, comprises a driving member having an axis, a first end fixed to a base member, and a second end susceptible to a linear displacement along the axis, first and second lever members attached to the base member at first and second fulcrum points, respectively, and to the second end at first and second power points, respectively, first and second plate-shaped resilient power transmission member having principal surfaces perpendicular to a reference plane including the axis and the first and the second power points and attached to the first and the second lever members at first and second weight points, respectively, and a differential lever member carried by the first and the second transmission members at first and second predetermined points, respectively. According to this invention, a distance between first and second midpoints between the first weight and predetermined points and between the second weight and predetermined points is kept substantially constant irrespective of the linear displacement.

DESCRIPTION OF THE PREFERRED EMBODIMENT

Figure 1:
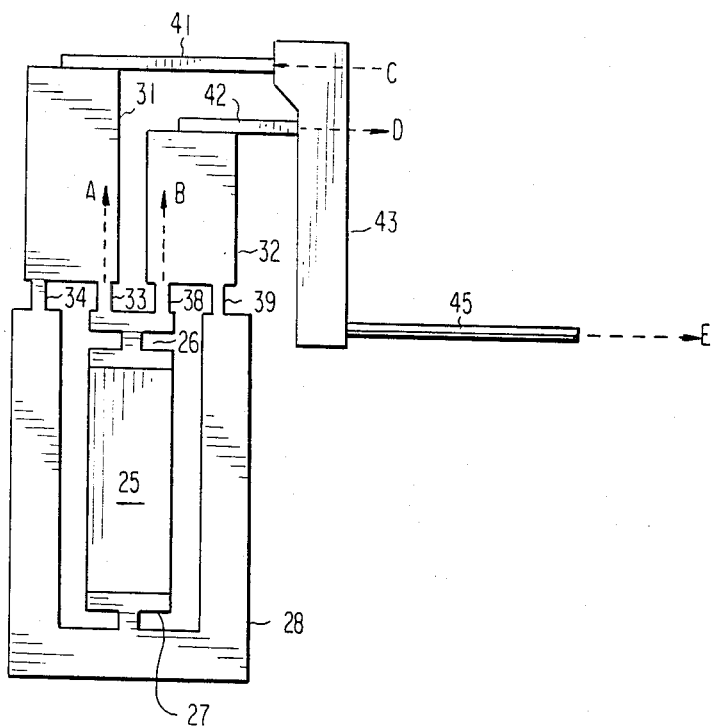
FIG. 1 is a side view off a differential lever actuator to which the instant invention is applicable.

Referring to FIG. 1, a differential lever actuator typically comprises a piezoelectric or electroexpansive body 25 of a rectangular prismal shape having first through fourth side surfaces and first and second end surfaces. Merely for convenience of the description which follows, the side surface illustrated as a rectangle will be referred to as the first side surface. The first and the second end surfaces will be called bottom and top surfaces, respectively, according to the illustration. Surfaces depicted at the top and the bottom of a part of the differential lever actuator will likewise be named in the following.

A pair of electrodes (not shown) are formed on the first side surface and the opposing side surface. Alternatively, the electrodes may be formed on the side surfaces illustrated by lines on both sides of the first side surface. Top and bottom connection pieces 26 and 27 are attached to the piezoelectric body 25 at the top (second) and the bottom (first) surfaces. When a driving voltage is applied across the piezoelectric body 25 through the electrodes, the piezoelectric body 25 elongates. As a result of the elongation, the top connection piece 26 is given a linear displacement relative to the bottom connection piece 27. The linear displacement has a direction which is parallel to the axis of the prismal shape. Inasmuch as the linear displacement is used in actuating or operating the differential lever actuator, as will presently become clear, the piezoelectric body 25 serves as a driving member.

A base or holding member 28 is generally channel-shaped and comprises a beam portion and first and second legs to define a space for the piezoelectric body 25. In the example being illustrated, the first and the second legs have coplanar leg end surfaces. The bottom connection piece 27 is fixed to the beam portion. When the differential lever actuator is not put into operation and is at rest, the top connection piece 26 has a top surface which is substantially flush with the coplanar leg end surfaces.

First and second lever members 31 and 32 are swingably supported by the piezoelectric body 25 and the base member 28. More particularly, the first lever member 31 has a bottom surface which is substantially parallel to the coplanar leg end surfaces and is coupled to the top connection piece 26 and the first leg by a first actuating member 33 and a first fulcrum member 34, respectively. At least the fulcrum member 34 should be resiliently bendable. The second lever member 32 is similarly coupled to the top connection piece 26 and the second leg by second actuating and fulcrum members 38 and 39, respectively. In the illustrated example, the members 33, 34, 38, and 39 are plate-shaped. As described in the above-referenced patent application, the members 33, 34, 38, and 39 may be rod-shaped. Furthermore, it is preferred that a single material, such as a metallic material, be used in fabricating the connection pieces 26 and 27 and the members 31 to 34, 38, and 39 as an integral entirety, unless at least one of the connection pieces 26 and 27 is of a cup shape.

In response to the linear displacement transmitted through the first actuating member 33, as indicated by a first dashed-line arrow A, the first lever member 31 swings, to result in a first angular displacement around a first axis of rotation Q (FIG. 2) which passes through the first fulcrum member 34 centrally and parallel to the coplanar leg end surfaces. Likewise, the linear displacement is transmitted through the second actuating member 38 as shown by a second dashed-line arrow B to give the second lever member 32 a second angular displacement around a second axis of rotation R (FIG. 2) which passes through the second fulcrum member 39 in a similar manner. The axes Q and R of rotation may alternatively be called first and second fulcrum points, respectively.

It is possible to understand that the linear displacement is transmitted through the first and the second actuating members 33 and 38 to the first and the second lever members 31 and 32 at first and second power points, respectively, and that the first and the second power points are on a plane which includes the axis of the prismal shape. The plane under consideration, is herein referred to as a reference plane, parallel to the first side surface of rectangle 25.

It is also possible to understand that the first and the second fulcrum points Q and R are also on the reference plane and that the first side surface of the piezoelectric body 25 is parallel to the reference plane. In this event, the first and the second angular displacements are antiparallel, namely, have a common direction and opposite senses.

A first plate-shaped springy or resilient transmission member 41 has a first end attached to the first lever member 31 at a first area of attachment. It is possible to direct attention to a point on a line at which the first transmission member 41 comes into contact with the first lever member 31. The point is herein called a first weight point (P1 in FIG. 3) of the first lever member 31.

A similar second transmission member 42 has a first end attached to the second lever member 32 at a second weight point of the second lever member 32. A line segment between the first fulcrum and weight points should be longer than another line segment between the first fulcrum and power points. A similar relation should hold also for the second lever member 32.

Second ends of the respective transmission members 41 and 42 are attached to first and second predetermined points or positions of a third lever member 43, which is herein named a differential lever member 43. The differential lever member 43 has a length which is longer than a distance between the first and the second predetermined points. The first and second transmission members 41 and 42 have principal surfaces which are perpendicular to the reference plane.

Responsive to the first angular displacement, the first transmission member 41 pulls the differential lever member 43 in the direction and sense indicated by a third dashed-line arrow C. Similarly, the second transmission member 42 pushes the differential lever member 43 in another direction and sense depicted by a fourth dashed-line arrow D. Displacements of the predetermined points of the differential lever member 43 are substantially antiparallel, namely, in a substantially same direction and in opposite senses. The pull and the push therefore act as a couple on the differential lever member 43 and consequently result in a rotational movement.

When a rod-shaped wire or piece 45 is carried by the differential lever member 43, the rotational movement gives the wire 45 a displacement indicated by a fifth dashed-line arrow E. In a printing element of a printing head of an impact printer, the wire 45 is capable of printing a dot on a printing area (not shown) in response to the displacement E (the same reference letter being used).

Figure 2:
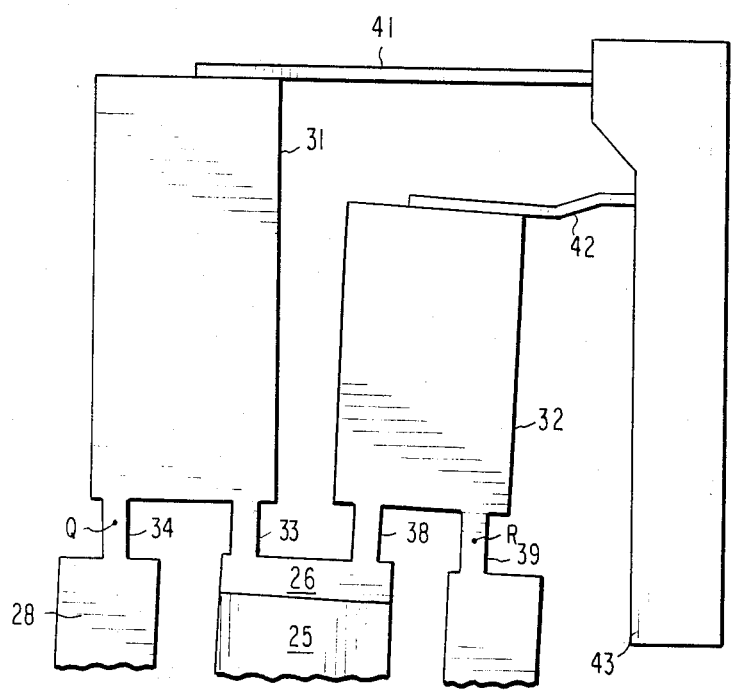
FIG. 2 is an enlarged partial schematic side view of a conventional differential lever actuator put in an operated state.

Turning to FIG. 2, a conventional differential lever actuator of the type illustrated with reference to FIG. 1, is depicted in an actuated or operated state. The top connection piece 26 is illustrated in a simplified shape. The bottom connection piece 27 (FIG. 1) may likewise be simply shaped. At any rate, the differential lever member 43 exerts reactions on the first and the second transmission members 41 and 42 when put into the rotational movement. The reactions give rise to a tensil and compressive stress in the transmission members 41 and 42. It has been inevitable that each transmission member 41 or 42 is subjected additionally to a bending stress and is thereby given a complicated deformation. In the illustrated example, the second transmission member 42 is complicatedly deformed at two positions in the manner exaggeratedly depicted. The deformation results in a shearing stress in the transmission member 41 or 42.

Figure 3:
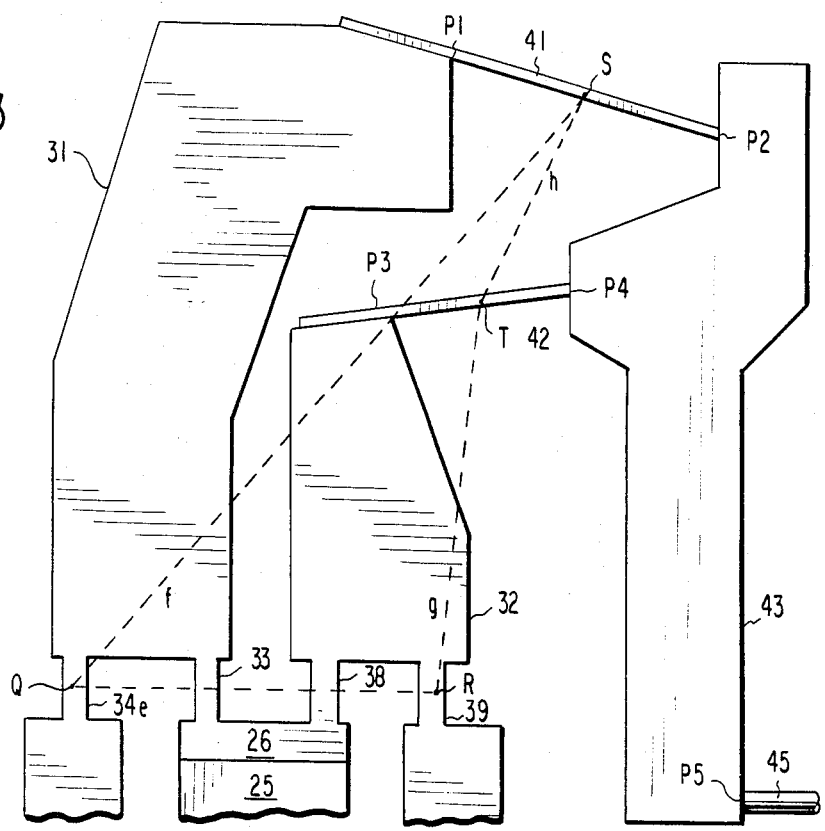
FIG. 3 is a partial side view of a differential lever actuator according to a first embodiment of this invention.
Figure 4:
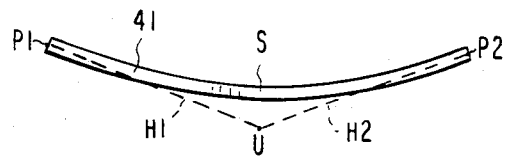
FIG. 4 shows an enlarged side view of a principal portion of a transmission member of the actuator depicted in FIG. 3 and exaggeratedly put in an operated state.

Referring now to FIGS. 3 and 4, a differential lever actuator according to a first embodiment of the present invention comprises similar parts designated by like reference numerals. The parts are, however, specifically shaped and are coupled to one another in a particular manner.

Let first and second points or lines of connection of the first transmission member 41 to the first and the differential lever members 31 and 43, be denoted by P1 and P2, respectively. The specific shape and the particular manner are such that the reaction on the first transmission member 41 gives a simple arcuate bend or flexure to that portion of the first transmission member 41 which lies between the first and the second points P1 and P2 of connection. More precisely, the first transmission member 41 is bent into a circular arc when viewed parallel to the principal surfaces. The second transmission member 42 is similarly bent between third and fourth points P3 and P4 of connection to the second and the differential lever members 32 and 43, respectively. The simple arcuate bend gives each transmission member 41 or 42 a uniform distribution of elastic stresses. Incidentally, a point will be called a fifth point P5 at which the wire 45 is attached to the differential lever member 43. The first and the third points P1 and P3 of connection correspond to the first and the second weight points, respectively. The second and the fourth points P2 and P4 of connection correspond to the first and the second predetermined points, respectively.

Attention will be directed to an axis S which passes through the first transmission member 41 centrally between the points P1 and P2 of connection and perpendicular to the reference plane. For convenience of reference, the axis S will be called either a first center axis or a first midpoint. The bend is symmetric as regards a plane which includes the first center axis S and is normal to the principal surfaces of the first transmission member 41 and consequently perpendicular to the reference plane. A second center axis or midpoint T is likewise defined in connection with the second transmission member 42.

The bends in the respective transmission members 41 and 42 are ordinarily small. In other words, the arcuate bend in each transmission member 41 or 42 has a long radius of curvature. Under the circumstances, it is possible to regard the first transmission member 41 (more precisely, the portion between the points P1 and P2 of connection) as a link mechanism comprising first and second links or arms H1 and H2 which are tangential to the transmission member 41 at the points P1 and P2 of connection and are linked to each other at a junction U. The arms H1 and H2 have equal lengths. The points P1 and P2 are subjected to displacements which are substantially identical with displacements of both ends of the link mechanism. The second transmission member 42 is also reported as a like link mechanism.

Referring more particularly to FIG. 3, a four-arm planar link work, depicted by dashed lines, will be considered in relation to the differential lever actuator. The link work comprises a fixed arm e between the first and the second fulcrum points Q and R, a first input arm f between the first fulcrum point and midpoint Q and S, a second input arm g between the second fulcrum point and midpoint R and T, and an output arm h between the first and the second midpoints S and T. The notations e through h will be used also in representing lengths of the respective arms.

It has now been confirmed that the first and the second transmission members 41 and 42 are simply arcuately bent when the link work deforms in response to the linear displacement of the top connection piece 26 with the output arm length h kept constant. In other words, the output arm h should have a predetermined length no matter whether the differential lever actuator is at rest, put into the operated state, or under transition from the rest state to the operated state.

The deformation will be studied by assuming that the reference plane is a complex plane having a real axis along the input arm e. An equation holds for the link work, such that:

$$e - f \cdot \exp(i\phi(e, f)) + g \cdot \exp(i\phi(e, g)) + h \cdot \exp(i\phi(e, h)) = 0. \tag{1}$$

where i represents the imaginary unit and $\phi(e, f)$, $\phi(e, g)$, and $\phi(e, h)$ represent angles which are measured counterclockwise from the real axis (the fixed arm e) to the arms f through h, respectively.

When an increment $\phi_1$ and $\phi_2$ are algebraically added to the angles $\phi(e, f)$ and $\phi(e, g)$, respectively, the arm lengths are invariable if the following equation holds:

$$\phi_2/\phi_1 = [v \cdot \sin\phi(e, f) - \sin(\phi(e, g) - \phi(e, f))]/[u \cdot \sin\phi(e, f) - \sin(\phi(e, g) - \phi(e, f))], \tag{2}$$

where u=e/f and v=e/g. Under the circumstances, the output arm h is subjected to an angular displacement of a magnitude $\Phi$ given by:

$$\Phi = [f \cdot \cos\phi(e, f)/(g \cdot \cos\phi(e, f))]\phi_1. \tag{3}$$

By way of example, let the angles $\phi(e, f)$ and $\phi(e, g)$ be subjected to an increment and a decrement of an equal value $\phi$, respectively. When the arm lengths e through h are 10 mm, 22.5 mm, 11 mm, and 7.5 mm, respectively, and the angles $\phi(e, f)$ and $\phi(e, g)$ are 50° and 85°, respectively, Equations (1) and (2) are satisfied when the angle $\phi(e, h)$ is approximately equal to 63°. From Equation (3), the magnitude of the angular displacement of the output arm h is about $4.5\phi$.

As would have become obvious from the above, the angles $\phi(e, f)$ and $\phi(e, g)$ should be subjected to an increment and a decrement in order to differentially actuate the differential lever member 43. In this event, either of the first and the second midpoints S and T should be situated inside a triangle having vertices at the first and the second fulcrum points Q and R and the other of the midpoints S and T.

Figure 5:
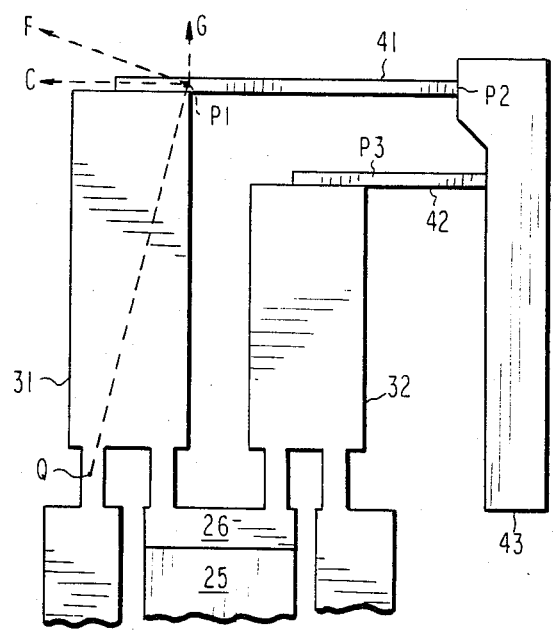
FIG. 5 is a partial side view of another conventional differential lever actuator.

Turning to FIG. 5, the first angular displacement results in a force F which acts on the first transmission member 41 as indicated by a sixth dashed-line arrow F (the same reference letter being used) in a conventional differential lever actuator of the type illustrated with reference to FIG. 1. The force acts on the first weight point P1 (FIG. 3) perpendicularly of a straight line which passes through the first fulcrum and weight points Q and P1. The force F has a tangential component in the direction of the third dashed-line arrow C and a normal component G which is normal to the first transmission member 41 as depicted by a seventh dashed-line arrow G (the same reference letter being used). The normal component G does not contribute to the displacement of the second point P2 of connection, namely, the first predetermined point of the differential lever member 43, but to the deformation of the first transmission member 41 and is superfluous with respect to actuation of the differential lever member 43 and accordingly of the differential lever actuator. The second angular displacement of the second lever member 32 results in a likewise superfluous component at the second weight point P3.

Figure 6:
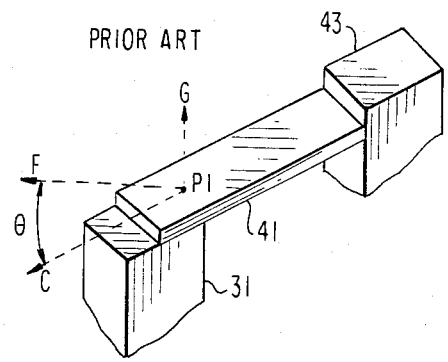
FIG. 6 is a fragmentary perspective view of the actuator illustrated in FIG. 5.

Referring to FIG. 6, consideration will be given to the first transmission member 41 depicted in FIG. 5. When the force F forms an angle $\theta$ with the transmission member 41, the tangential component has a tangential magnitude $F \cos \theta$. The normal component G has a normal magnitude $F \sin \theta$. Let the transmission member 41 has a thickness t, a width w, and a length L between the points P1 and P2 of connection. The tangential component results in the tensil stress of a magnitude $\sigma_t$ given by $F \cos \theta/(wt)$. The bending stress has a maximum magnitude $\sigma_{bm}$ of $tLF \sin \theta/(4I)$ at the principal surfaces, where I represents the second-rank moment of inertia of a cross-sectional area which the transmission member 41 has normal to the principal surfaces. Inasmuch as the moment of inertia I is equal to $wt^3/12$, the maximum bending stress is equal to $3LF \sin \theta/(wt^2)$. The transmission member 41 is therefore subjected to a maximum stress $\sigma_m$ of:

$$\sigma_m = \sigma_t + \sigma_{bm} \tag{4}$$
$$= F\cos\theta/(wt) + 3LF\sin\theta/(wt^2)$$
$$= [F/(wt)] \cdot [\cos\theta + (3L/t) \cdot \sin\theta].$$

Figure 7:
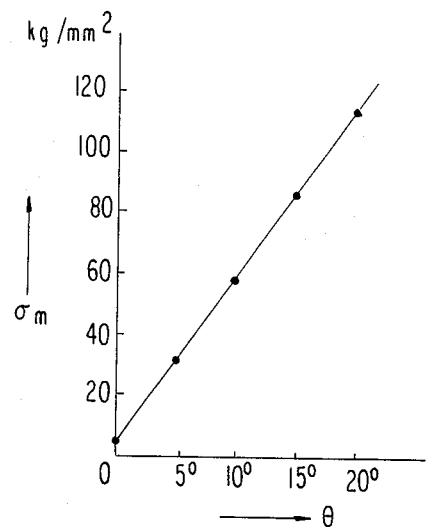
FIG. 7 is a diagram illustrative of a characteristic of differential lever actuators.

Turning to FIG. 7, the maximum stress $\sigma_m$ is depicted versus the angle $\theta$ for a transmission member 41 or 42 which has a thickness of 0.3 mm, a width of 2 mm, and a length L of 10 mm between the points P1 and P2 or P3 and P4 of connection and to which a force F of 2 kg is applied with the angle $\theta$ varied. From Equation (4):

$$\sigma_m = 3.33(\cos\theta + 66.6 \sin\theta),$$

in kg/mm².

Inasmuch as it is usual that the length L is considerably greater than the thickness t, the maximum stress $\sigma_m$ steeply increases with an increase in the angle $\theta$. When steel of a fatigue limit of about 40 kg/mm² is used in fabricating the transmission member 41 or 42 for which FIG. 7 is depicted, the angle $\theta$ should be 5° or less in order to avoid damage to the transmission member 41 or 42 during repeated operation.

Figure 8:
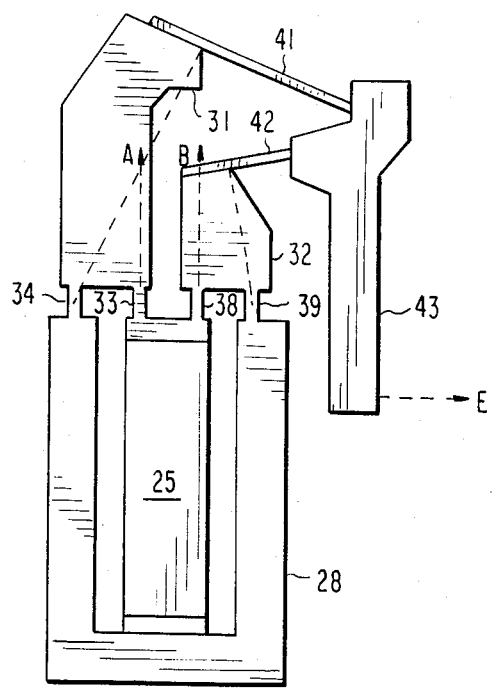
FIG. 8 is a side view of a differential lever actuator according to a second embodiment of this invention.

Referring now to FIG. 8, a differential lever actuator according to a second embodiment of this invention comprises similar parts designated by like reference numerals. A line segment which connects the first fulcrum point Q (FIG. 2) to the first weight point P1 (FIG. 3), is rendered substantially perpendicular to the principal surfaces of the first transmission member 41. Another line segment which lies between the second fulcrum and weight points R and P3, is substantially perpendicular to the principal surfaces of the second transmission member 42. In the example being illustrated, the displacement E of the wire 45 (FIG. 1) is perpendicular to the directions A and B.

Figure 9:
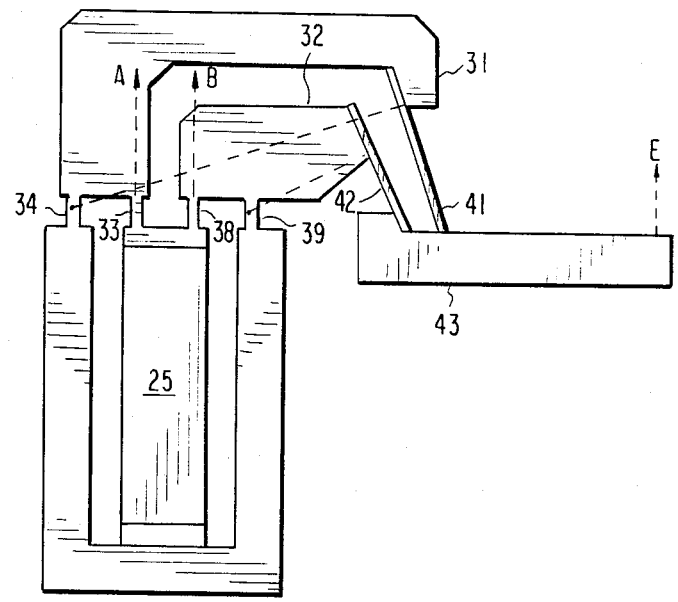
FIG. 9 is a side view of a differential lever actuator according to a third embodiment of this invention.

Turning to FIG. 9, a differential lever actuator according to a third embodiment of this invention comprises similar parts which are again designated by like reference numerals. The specific shapes of the parts and the particular manner of arranging the parts, are designed so as to position the transmission members 41 and 42 as described in conjunction with FIG. 8 and yet the displacement E parallel to the displacements A and B.

In connection with the differential lever actuators illustrated with reference to FIGS. 8 and 9, it should be noted that the maximum stress $\sigma_m$ depends on the thickness, width, and length of each transmission member 41 or 42 even when the members 41 and 42 are made of a common material. The angle $\theta$ described with reference to FIG. 6 may therefore be rendered substantially equal to zero only in that one of the transmission members 41 and 42 in which the maximum stress $\sigma_m$ will become nearly equal to the fatigue limit of the material.

Referring again to FIG. 9, consideration will be given to a differential lever actuator according to a fourth embodiment of this invention wherein the lengths e through h (FIG. 3) are invariable throughout operation with the angle θ (FIG. 6) rendered substantially equal to zero for each of the first and the second transmission members 41 and 42. Calculation will be exemplified for the first and second fulcrum points Q and R, first and second power points given by the first and the second actuating members 33 and 38, respectively, first and second weight points P1 and P3, first and second predetermined points P2 and P4, and first and second midpoints S and T.

A righthand orthogonal x-y coordinate system (not depicted) will be considered on the reference plane with the origin put at the first fulcrum point Q. The x axis successively intersects the first and the second actuating members 33 and 38 and then passes through the second fulcrum point R.

The first fulcrum point Q has coordinates (0, 0). Let the points of intersection of the x axis with the first and the second actuating members 33 and 38 and the second fulcrum point R have coordinates $(x_1, y_1)$, $(x_2, y_2)$, and $(x_3, y_3)$. The ordinates $y_1$ through $y_3$ are equal to zero. Furthermore, let the first through the fourth points P1 to P4 of connection and the first and the second midpoints S and T have coordinates $(x_4, y_4)$, $(x_5, y_5)$, $(x_6, y_6)$, $(x_7, y_7)$, $(x_8, y_8)$, and $(x_9, y_9)$.

It will be assumed that the first and the second midpoints S and T are given coordinates $(x_8', y_8')$ and $(x_9', y_9')$ when the differential lever actuator is put in the operated state. Inasmuch as the output arm h should have a constant length no matter when the differential lever actuator is at rest and in the operated state:

$$[(x_8-x_9)^2+(y_8-y_9)^2]-[(x_8'-x_9')^2+(y_8'-y_9')^2]=0. \quad V1$$

Inasmuch as the line passing through Q(0, 0) and P1($x_4$, $y_4$) should be perpendicular to the line passing through P1($x_4$, $y_4$) and P2($x_5$, $y_5$) and inasmuch as the line passing through R($x_3$, 0) and P3($x_6$, $y_6$) should be perpendicular to the line passing through P3($x_6$, $y_6$) and P4($x_7$, $y_7$):

$$x_4(x_6-x_4)+y_4(y_5-y_4)=0. \quad V2$$

and $$(x_6-x_3)(x_7-x_6)+y_6(y_7-y_6)=0. \quad V3$$

On designing the differential lever actuator, it may be that the distances between the points ($x_1$, 0) and ($x_2$, 0) and between the points ($x_1$, 0) and ($x_3$, 0) are preliminarily given as a and b, respectively, and that the linear displacement of the top connected piece 26 has a preselected magnitude M along the ordinate. The first and the second angular displacements have magnitudes $\phi_1$ and $\phi_2$ given by $M/x_1$ and $M/(x_3-x_2)$ in radian. It will be assumed that the displacements given to the first and the second weight points P1 and P3, are parallel to the first and the second transmission members 41 and 42, respectively, and have a common magnitude. Inasmuch as the magnitudes are:

$$(M/x_1) \cdot \sqrt{[x_4^2 + y_4^2]}, \quad V4$$

and $[M/(x_3 - x_2)] \cdot \sqrt{[(x_6 - x_3)^2 + y_6^2]}$,

-continued
$$(1/x_1)^2 \cdot [x_4^2 + y_4^2] - [1/(x_3 - x_2)]^2 \cdot [(x_6 - x_3)^2 + y_6^2] = 0.$$

The angle of the rotational movement of the differential lever member 43 is equal to an angle formed between the line passing through the first and the second midpoints S($x_8$, $y_8$) and T($x_9$, $y_9$) and another line passing through the points ($x_8'$, $y_8'$) and ($x_9'$, $y_9'$). The angle under consideration may be prescribed and be represented by Φ as described before. Therefore:

$$\arctan[(y_8-y_9)/(x_8-x_9)]-\arctan[(y_8'-y_9')/(x_8'-x_9')]=\Phi. \quad V5$$

Inasmuch as values to be calculated are $x_1$ and $x_4$ through $x_7$ and $y_4$ through $y_7$, nine in number, four more conditions are necessary in addition to five conditions V1 through V5 described above. Two of the conditions in question may be such that the lengths are predetermined as L1 and L2 for the first and the second transmission members 41 and 42, each between the points P1 and P2 or P3 and P4 of connection. Namely:

$$(x_5-x_4)^2+(y_5-y_4)^2=(L1)^2, \quad V6$$

and $$(x_7-x_6)^2+(y_7-y_6)^2=(L2)^2. \quad V7$$

Another of the four additional conditions may be as regards an angle formed by the transmission members 41 and 42. If an angle Ψ is preselected as the angle in question, $$\arctan[(y_5-y_4)/(x_5-x_4)]-\arctan[(y_7-y_6)/(x_7-x_6)]=\Psi. \quad V8$$

The remaining condition may be for the distance between the first transmission member 41 and the second predetermined point P4 of the differential lever member 43. If a distance Z is predetermined, $$[x_7/(x_5 - x_4) - x_4/(x_5 - x_4) - x_7/(y_5 - y_4) + y_4/(y_5 - 44)]^2/[1/(x_5 - x_4)^2 + 1/(y_5 - y_4)^2] = Z^2. \quad V9$$

Figure 10:
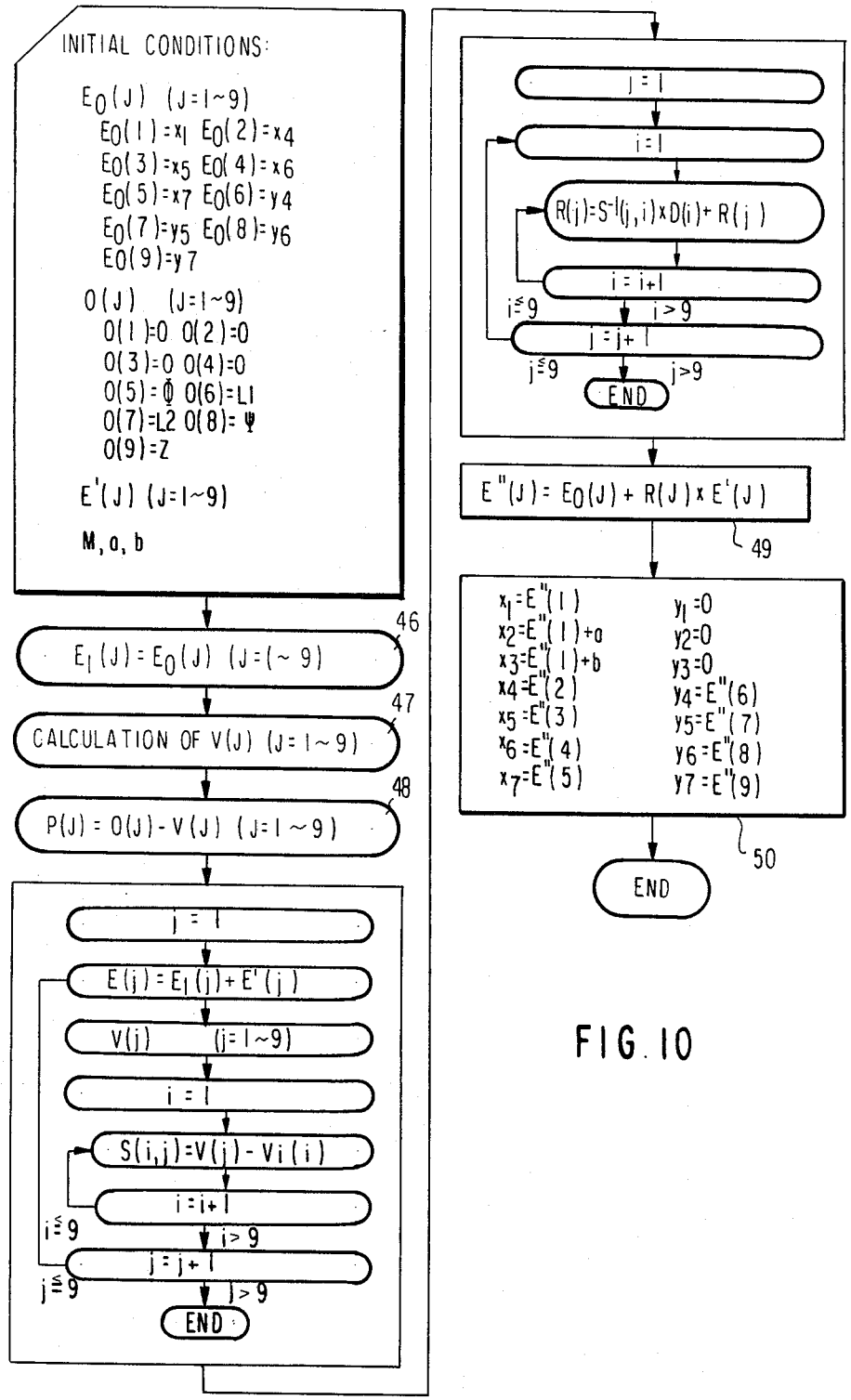
FIG. 10 is a flow chart for use in designing a differential lever actuator according to a fourth embodiment of this invention.

Turning to FIG. 10, the nine unknown values are calculated preferably by resorting to a multi-dimensional Newton method. On carrying out the calculation, it should be understood that the square roots are used in the conditions V1 (respective terms), V4 (respective terms), V6, V7, and V9 according to the definitions described above.

At first, an initial value matrix $E_0(J)$ is formed for J=1 through 9 by using initial values $x_1$, $x_4$ to $x_7$, and $y_4$ to $y_7$ (the coordinates being used for simplicity of denotation as the initial values as they stand) as $E_0(1)$ through $E_0(9)$, respectively. An objective matrix Q(J) is furthermore formed according to the conditions V1 through V9. More specifically, O(5)=Φ, O(6)=L1, O(7)=L2, and O(8)<Ψ, other elements of the objective matrix being equal to zero. An increment matrix E'(J) is predetermined by optionally selecting increments for the respective elements of the initial value matrix. Incidentally, the magnitude M and the distances a and b are preselected as described hereinabove.

It may now be mentioned for convenience of the following description that, on a step indicated at 46, a variable matrix $E_1(J)$ is formed of the initial value matrix $E_0(J)$. On a next succeeding step 47, an intermediate matrix $V(J)$ is calculated by substituting the coordinates given by the variable matrix $E_1(J)$ in the lefthand sides of Equations V1 through V9. On a next subsequent step 48, a difference matrix $D(J)$ is calculated by subtracting the intermediate matrix $V(J)$ from the objective matrix $O(J)$.

A sensitivity matrix $S(i, j)$ is calculated by using first and second parameters i and j (the first parameter being represented by the reference letter which was previously used in representing the imaginary unit). As will shortly become clear, the sensitivity matrix represents a variation in the intermediate matrix $V(J)$ from a current value $V_1(i)$ for a current value $E_1(j)$ of the variable matrix $E_1(J)$ to a new value $V(i)$ for a new value $E(j)$ which is obtained for the variable matrix $E_1(J)$ by addition of the increment matrix $E'(J)$ to the current value $E_1(j)$. In order to calculate the sensitivity matrix, the second parameter j is varied from 1 up to 9. For each value of the second parameter j, the new values $E(j)$ and $V(j)$ are calculated. In the meantime, the first parameter i is increased from 1 to 9 to successively calculate elements of the sensitivity matrix.

Calculation proceeds to an optimum multiplier matrix $R(J)$, which is a matrix of optimum multipliers for the respective elements of the increment matrix $E'(J)$. First and second parameters are again used, which will be denoted by i and j as before, respectively. The second parameter j is increased from 1 up to 9. For each value of the second parameter j, the first parameter i is varied from 1 to 9. Meanwhile, each multiplier $R(j)$ is iteratively calculated by a sum given by $D(i).S^{-1}(j, i)+R(j)$, where $S^{-1}(j, i)$ represents the inverse matrix of the sensitivity matrix $S(i, j)$. In the righthand side, elements of the optimum multiplier matrix $R(j)$ are rendered equal to zero at first.

On a next stage designated at 49, an eventual value matrix $E''(J)$ is calculated. The coordinates are eventually decided as indicated in a rectangle labelled 50.

Figure 11:
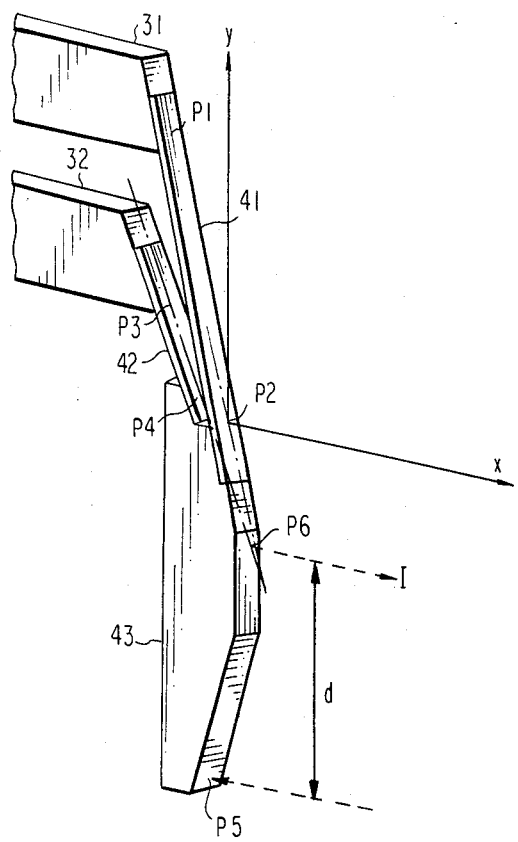
FIG. 11 schematically shows a fragmentary perspective view of still another conventional differential lever actuator.

Turning to FIG. 11, the first and the second transmission members 41 and 42 intersects each other at a sixth point P6. When the wire 45 (FIG. 1) prints a dot on the printing area, the wire 45 impresses on the fifth point P5 of attachment a reaction in a direction exemplified by an eighth dashed-line arrow H. The reaction H (the same reference letter being used) results in tensil and compressive stresses in the transmission members 41 and 42 so that a resultant force of the tensil and the compressive stresses acts on the sixth point P6 in a direction indicated by a ninth dashed-line arrow I (the same reference letter for the moment of inertia being used). The reaction H and the resultant force I are antiparallel and have a common magnitude. When a distance d between the directions H and I is not equal to zero, the reaction H and the resultant force I act as a couple, which results in bending stresses in the transmission members 41 and 42. If the distance d is equal to zero, a balance or equilibrium is achieved between the reaction H and the resultant force I to make the bending stress substantially disappear in each transmission member 41 or 42.

A righthand orthogonal x-y coordinate system will locally be considered on the reference plane. The origin is placed at the first predetermined point P2 of the differential lever member 43. The x axis is paralel to the directions H and I. Coordinates of the respective points P1 to P5, the distance d, and the thickness t and width w of each transmission member 41 or 42 will be measured in mm.

Figure 12:
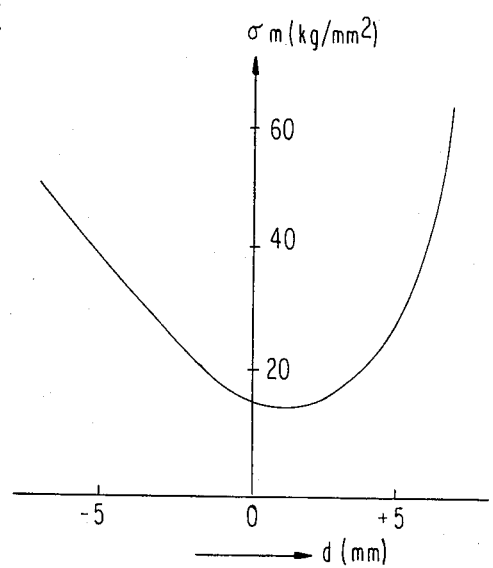
FIG. 12 is a diagram illustrative of another characteristic of differential lever actuators of the type shown in FIG. 11.

Further turning to FIG. 12, the maximum stress $\sigma_m$ in the transmission members 41 and 42 were measured by simulation. By way of example, the points P1, P2, P4, and P5 are given coordinates $(-3.7, 12.9)$, $(0, 0)$ $(-2.3, 2.0)$ and $(-3.0, -8.6)$, respectively. The second weight point P3 is given a variable abscissa x and a predetermined ordinate of 11.1 so that the distance d is variable with the variable abscissa x. Along the abscissa of FIG. 12, the distance d has the plus and the minus signs when positioned above and below the direction H, respectively.

The result of simulation is depicted by a curve for the transmission members 41 and 42 which have a common thickness of 0.3 mm and a common width of 2 mm. A magnitude of 15 newtons was selected for the reaction H. As described above, the bending stress little appears when the distance d is near to zero. The maximum stress $\sigma_m$ increases with an increase in the absolute value of the distance d as a result of an increase in the bending stress. When the transmission members 41 and 42 are made of steel of a fatigue limit of about 40 kg/mm$^2$, the absolute value of the distance d must be less than about 5 mm in order to avoid breakage of the transmission members 41 and 42 during repeated operation.

Figure 13:
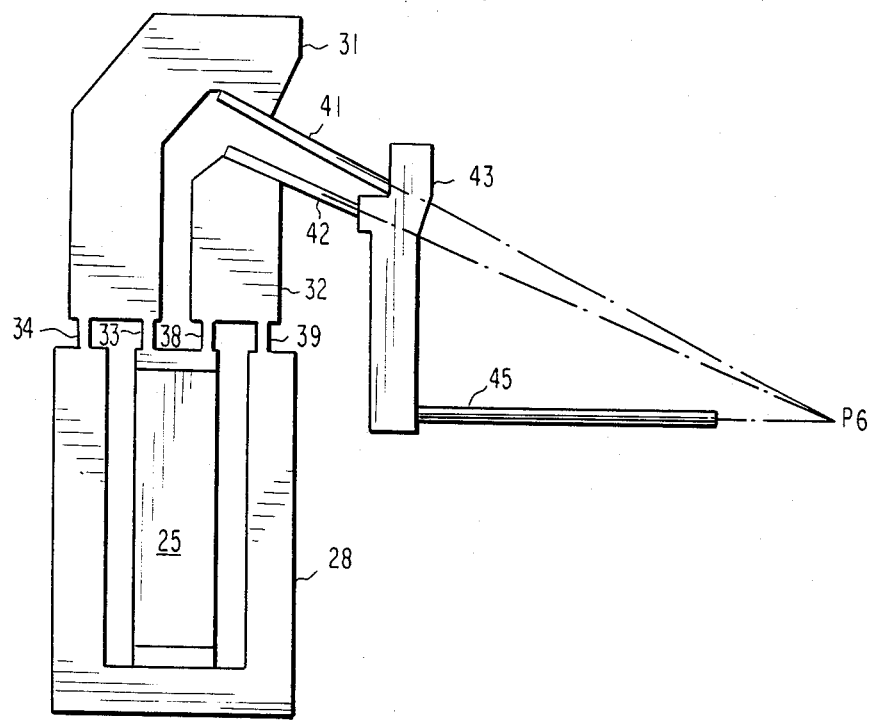
FIG. 13 is a side view of a differential lever actuator according to a fifth embodiment of this invention.

Referring now to FIG. 13, a differential lever actuator according to a fifth embodiment of this invention comprises similar parts designated by like reference numerals. The above-defined distance d is rendered equal to zero. In other words, the parts and the arrangement are designed so that center lines passing lengthwise through the respective transmission members 41 and 42 and a straight line passing axially through the wire 45 are concurrent at the sixth point P6. Although the displacement E of the wire 45 is perpendicular to the directions A and B in the illustrated example, it would be readily feasible to make the direction E form a predetermined angle with the directions A and B as depicted in FIG. 9, where the predetermined angle is equal to a right angle.

Reverting to FIGS. 3, 8, 9, and 13, the differential lever actuators illustrated are designed so that the bending stress appears only slightly in the transmission members 41 and 42 during operation. It should, however, be pointed out that this is true only before the wire 45 prints a dot on the printing area. When the wire 45 is brought into touch with the printing area to give an impact thereto, an impulsive force is given to the wire 45 from the printing area and fed back to the transmission members 41 and 42 to produce bending stresses.

Figure 14:
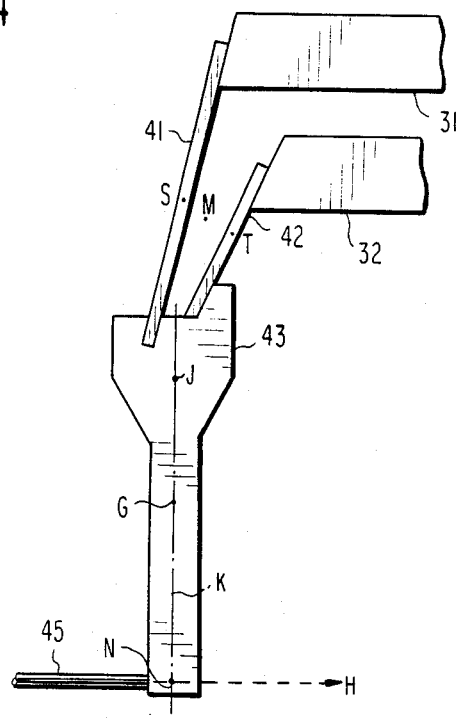
FIG. 14 is a partial side view of yet another conventional differential lever actuator.

Turning to FIG. 14, it will be presumed that a differential lever actuator is designed so that the above-mentioned output link or arm h between the first and the second midponts S and T has an invariable length throughout operation. While moved from a rest position to an actuated position, the arm h is subjected to a movement which can be resolved into a translational and a rotational component. The translational component does not give rise to bends in the transmission members 41 and 42. It is therefore possible to direct attention to the rotational component alone. The rotational component has an axis or point M (the reference letter for the magnitude of the linear displacement being used) ordinarily near the arm h.

When the impact is transmitted back through the wire 45 in the direction of the eighth dashed-line arrow H, the differential lever member 43 rotates around a center of percussion J. In order to take the center of percussion J into more detailed consideration, let the differential lever member 41 has a center of gravity G (the same reference letter being used that was used for the normal component). A dashed line K represents one of the principal axes of the ellipsoid of inertia of the differential lever member 43 that passes through the center of gravity G. The direction H of the reaction intersects the principal axis K at a seventh point, which will now be denoted by N. The center of percussion J is relative to the seventh point N of intersection and is on the principal axis K. A product of the line segments GJ and GN is equal to the square of the radius of inertia around the center of gravity G.

In the example being illustrated in FIG. 14, the wire 45 is attached to the differential lever member 43 near the free end. Under the circumstances, the center of percussion J is adjacent to the first and the second predetermined points P2 and P4 of the differential lever member 43 and is inside the differential lever member 43. The center of percussion J is therefore spaced apart from the center M of the rotational component. In this event, rotational movements take place around the respective centers M and J. As a result, the transmission members 41 and 42 are complicatedly deformed.

Figure 15:
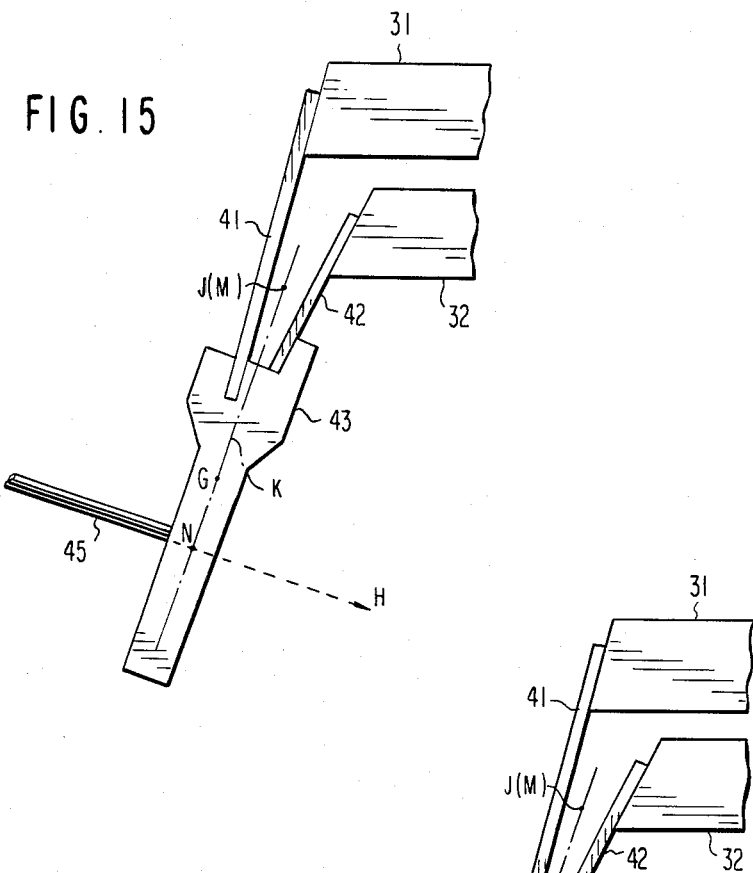
FIG. 15 is a partial side view of a differential lever actuator according to a sixth embodiment of this invention.

Referring now to FIG. 15, a differential lever actuator according to a sixth embodiment of this invention comprises similar parts designated by like reference numerals. The differential lever member 43 is carried by the first and the second transmission members 41 and 42 so that the principal axis K may pass through the above-described center M of the rotational component. Moreover, the wire 45 is attached to the differential lever member 43 so that the center of percussion J relative to the seventh point N of intersection may coincide with the center M of the rotational component.

When compared with the illustration of FIG. 14, it will be understood that the seventh point N is rendered nearer to the center of gravity G and that the center of percussion J relative to the seventh point N is rendered accordingly farther from the center of gravity G to situate outwardly of the differential lever member 43 at the center M of the rotational component. Consequently, the rotational component of the movement of the output arm h has the center M at the center J of the rotational movement caused to the differential lever member 43 by the reaction of the impact printing. The eventual result is such that the transmission members 41 and 42 are subjected only to simple arcuate bends even though the rotational movement of the differential lever member 43 is superposed on the rotational component of movement of the output arm h.

Figure 16:
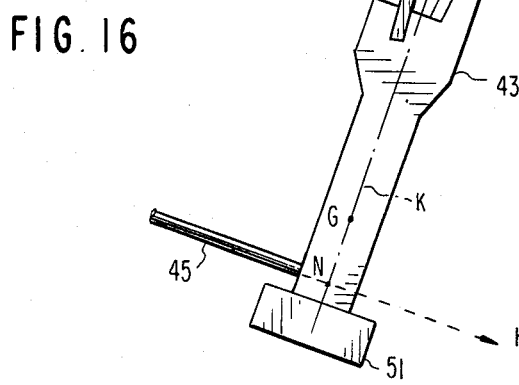
FIG. 16 is a partial side view of a differential lever actuator according to a seventh embodiment of this invention.

Referring to FIG. 16, a differential lever actuator according to a seventh embodiment of this invention again comprises similar parts designated by like reference numerals. A weight or mass-adding piece 51 is rendered integral with the differential lever member 43 at the free end thereof. As compared with the differential lever member 43 described in connection with FIG. 15, the center of gravity G is placed nearer to the free end. In addition, the radius of inertia around the center of gravity G becomes longer. It is therefore possible to make that center of percussion J coincide with the center M of the rotational component even with the seventh point N of intersection moved adjacent to the free end, which is relative to the seventh point N. In other words, it is feasible to attach the wire 45 to the differential lever member 43 nearer to the free end. This enables the wire 45 to travel a longer stroke upon printing.

The stress produced in the first and the second transmission members 41 and 42 was tested for an example of the differential lever actuator of the structure illustrated with reference to FIG. 16 and for a reference of the differential lever actuator of the structure illustrated with reference to FIG. 14. In each differential lever actuator, the first transmission member 41 was 0.26 mm thick, 1.7 mm wide, and 15 mm long. The second transmission member 42 was 0.20 mm thick, 2.2 mm wide, and 7 mm long. An angle of 10° was formed between the transmission members 41 and 42. When the wire 45 (0.25 mm in diameter) was used in impact printing with a maximum printing force of 6 newtons, the first and the second transmission members 41 and 42 of the reference were subjected to maximum stresses of 27 kg/mm$^2$ and 81 kg/mm$^2$, respectively, by the reaction of the impulsive force. In marked contrast, the first and the second transmission members 41 and 42 of the example were subjected only to maximum stresses of 18 kg/mm$^2$ and 35 kg/mm$^2$, respectively. When the transmission members 41 and 42 are made of steel of a fatigue limit of about 40 kg/mm$^2$, the stress developed in the second transmission member 42 of the reference exceeds the fatigue limit to a considerable extent. The second transmission member 42 of the reference is therefore liable to break during repeated operation. It will be appreciated that the stresses are reduced well below the fatigue limit in both transmission members 41 and 42 of the example.

Figure 17:
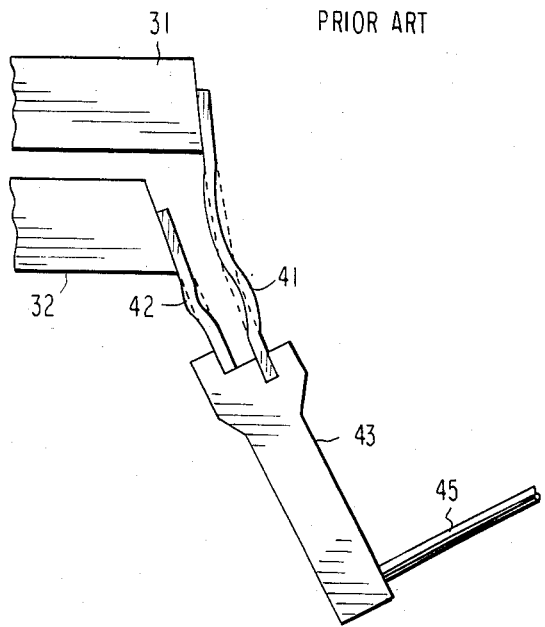
FIG. 17 exaggeratedly shows a partial side view of a further conventional differential lever actuator.

Turning to FIG. 17, the above-described simple arcuate bends are depicted by dashed-line circular arcs for the first and the second transmission members 41 and 42 of the type thus far been described. It is ordinary as pointed out heretobefore that each transmission members 41 or 42 is rendered thin so that the bend may take place in a simplest possible arcuate form. The transmission member 41 or 42 is, however, undesiredly subjected to higher-mode vibrations during the impact printing. This results in an undesired deformation of a complicated shape. As a result of superposition of the undesired deformation on the simple arcuate bend, the transmission members 41 and 42 are complicatedly deformed as exaggeratedly exemplified by solid lines.

Figure 18:
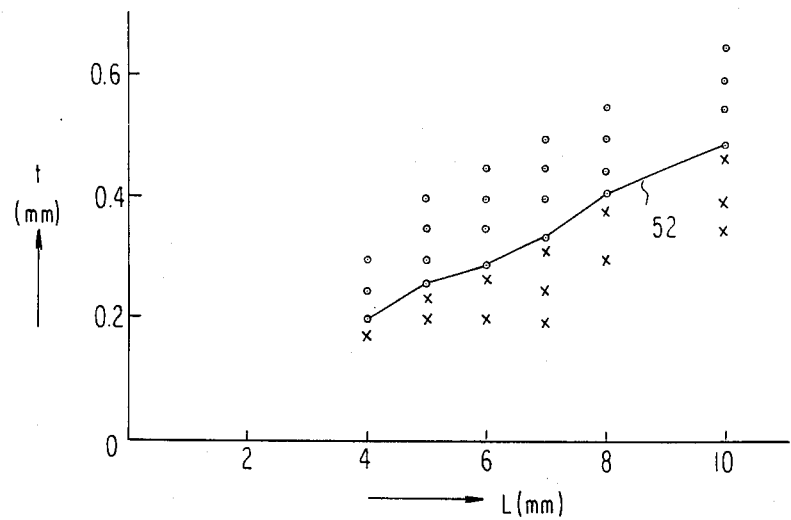
FIG. 18 is a diagram illustrative of still another characteristic of differential lever actuators of the type shown in FIG. 17.

Referring now to FIG. 18, occurrence of the undesired higher-mode vibrations was observed for each transmission member 41 or 42 made of a metal material of a Young's modulus of $2 \times 10^4$ kg/mm$^2$ for various values of the thickness t and the length L described in connection with FIG. 6. The length L was selected between 4 and 10 mm. Presence of the undesired higher-mode vibrations was observed with the thickness t varied for each length L and is indicated by crosses. Absence is shown by small circles. It is understood that the undesired vibrations did not take place when the thickness was above a polygonal line 52.

Referring back to an optional one of FIGS. 3, 8, 9, 13, 15, and 16, at least one of the transmission members 41 and 42 is given a ratio t/L of the thickness t to the length L, which ratio is equal to 0.05 or more in order to substantially suppress occurrence of the undesired higher-mode vibrations. It is to be noted that the vibrations do not occur in both transmission members 41 and 42 when the ratio t/L is 0.05 or more in only one of the transmission members 41 and 42. This is because the transmission members 41 and 42 are linked to each other through related parts. The ratio t/L of 0.05 or more is equivalent to a transmission member 41 or 42 of a thickness t which is at least equal to 0.05 times the length L. It is believed that an upper limit for the ratio t/L is unnecessary because the transmission members 41 and 42 are not very thick in general as thus far been exemplified.

As an example, a differential lever actuator was manufactured with the ratio t/L rendered greater than 0.05. For this purpose, the second transmission member 42 was given a length L of 7.5 mm and a thickness t of 0.45 mm. The ratio t/L was 0.06. Both transmission members 41 and 42 were not subjected to the higher-mode vibrations. The maximum stress was about 30 kg/mm². For use as a reference, another differential lever actuator was manufactured with the ratio t/L rendered less than 0.05. The second transmission member 42 was 7.5 mm long as in the example and 0.35 mm thick. The ratio t/L was 0.047. The transmission members 41 and 42 were subjected to the undesired higher-mode vibrations. The maximum stress amounted to about 53 kg/mm² in the second transmission member 42. It is now understood when the transmission members 41 and 42 are made of steel of a fatigue limit of about 40 kg/mm² that the transmission members 41 and 42 of the example are not liable to break during repeated operation but that the second transmission member 42 of the reference is very likely to break.

Figure 19:
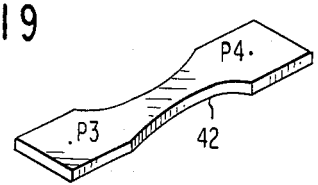
FIG. 19 is a perspective view of a transmission member for use in a differential lever actuator of the type illustrated in FIG. 15.
Figure 20:
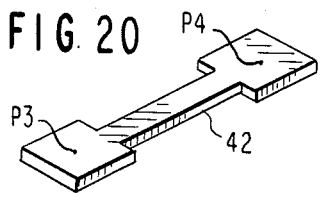
FIG. 20 is a similar view of a transmission member for use in a differential lever actuator of the type depicted in FIG. 15.
Figure 21:
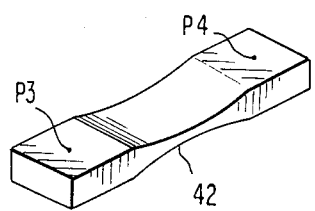
FIG. 21 is a like view of a transmission member for use in a differential lever actuator of the type illustrated in FIG. 15.
Figure 22:
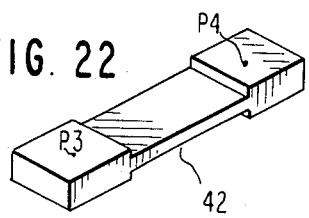
FIG. 22 is a similar view of a transmission member for use in a differential lever actuator of the type shown in FIG. 15.

Turning back to FIG. 3, it is to be noted that the stress concentrates at the first weight and predetermined points P1 and P2 or at the second weight and predetermined points P3 and P4 in each transmission member 41 or 42. As described above in connection with a few numerical examples, the second transmission member 42 is subjected to a stronger bending stress during operation than the first transmission member 41 in most cases. It is therefore desirable that at least the second transmission member 42 be wider as exemplified in FIGS. 19 and 20 at and/or near the points P3 and P4 than at center portions. Alternatively, at least the second transmission member 42 may be thicker at and/or near such points P3 and P4 as exemplified in FIGS. 21 and 22. As a further alternative, at least the second transmission member 42 may be wider as well as thicker at and/or near the points P3 and P4 so that the transmission member in question may have a greater cross-sectional dimension at and/or near the weight and predetermined points therefor than at the midpoint thereof.

Figure 24:
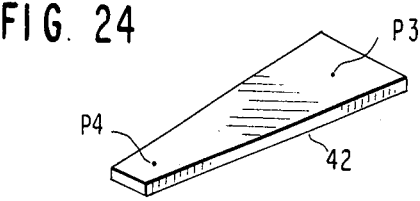
FIG. 24 is a perspective view of a transmission member for use in a differential lever actuator of the type shown in FIG. 15.
Figure 25:
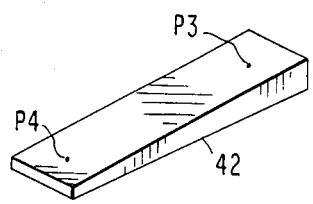
FIG. 25 is a similar view of a transmission member for use in a differential lever actuator of the type illustrated in FIG. 15.
Figure 23:
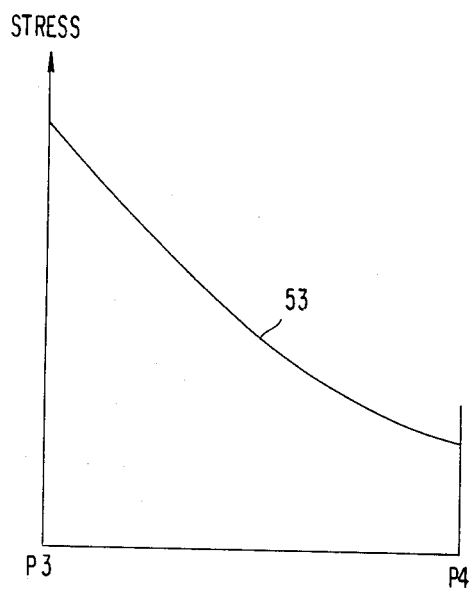
FIG. 23 is a diagram illustrative of yet another characteristic of differential lever actuators of the type illustrated in FIG. 14.

Referring to FIG. 23, attention will be directed to the first transmission member 41 as a representative of the transmission members 41 and 42 of the type described heretobefore. The stress distributes as exemplified by a curve 53 between the weight and the predetermined points P1 and P2. The distribution applies likewise to the second transmission member 42. The cross-sectional dimension, namely, the width and/or the thickness, of at least the second transmission member 42 is therefore desirously rendered greater at and/or near the weight point P3 than at the predetermined point P4 as exemplified in FIGS. 24 and 25.

While this invention has thus far been described in conjunction with several preferred embodiments thereof, it is now readily possible for one skilled in the art to carry this invention into effect in various other manners. Above all, the first and the second legs of the base member 28 need not have coplanar leg end surfaces. Examples are described in the patent application referred to hereinabove. The driving member 25 may not be of a rectangular prismal shape. The calculation is described with reference to FIGS. 9 and 10 only by way of example and may be dealt with in different ways. For example, a predetermined relationship may be assumed between the displacements given by the first and the second lever members 31 and 32 to their respective weight points P1 and P3. Incidentally, FIG. 14 is said to show a conventional lever actuator in the "brief description of the drawing" because the actuator is already illustrated with reference to FIG. 3.

What is claimed is:

1. In a differential lever actuator comprising a driving member having an axis, a first end fixed to a base member, and a second end susceptible to a linear displacement along said axis, first and second lever members attached to said base member at first and second fulcrum points, respectively, and to said second end at first and second power points, respectively, first and second plate-shaped resilient power transmission members having principal surfaces perpendicular to a reference plane including said axis and said first and said second power points and attached to said first and said second lever members at first and second weight points, respectively, and a differential lever member carried by said first and said second transmission members at first and second predetermined points, respectively, wherein said first and second fulcrum points, said first and second power points, said first and second weight points, and said first and second predetermined points are arranged to satisfy the following equation:

$$\frac{\phi_2}{\phi_1} = \frac{\frac{e}{g} \operatorname{Sin}\phi(e,f) - \operatorname{Sin}(\phi(e,g) - \phi(e,f))}{\frac{e}{f} \operatorname{Sin}\phi(e,f) - \operatorname{Sin}(\phi(e,g) - \phi(e,f))}$$

where
- e: the distance between the first and second fulcrum points
- f: the distance between the first fulcrum point and the midpoint between the first weight point and the first predetermined point (first midpoint)
- g: the distance between the second fulcrum point and the midpoint between the second weight point and the second predetermined point (second midpoint)
- $\phi(e,f)$: an angle which is measured counterclockwise from the line including the first and second fulcrum points to the line including the first fulcrum point and the first midpoint
- $\phi(e,g)$: an angle which is measured counterclockwise from the line including the first and second fulcrum points to the line including the second fulcrum point and the second midpoint
- $\phi_1$: an increment angle added to the angle $\phi(e,f)$
- $\phi_2$: an increment angle added to the angle $\phi(e,g)$ $$\phi_2/\phi_1 = l_1/l_2$$

where
- $l_1$: the distance between the first fulcrum point and the first power point
- $l_2$: the distance between the second fulcrum point and the second power point.

2. A differential lever actuator as claimed in claim 1, wherein one of said first and said second midpoints is inside a triangle having vertices at said first and said second fulcrum points and the other of said first and said second midpoints and said first and second midpoints and said first and second fulcrum points are in said reference plane.

3. A differential lever actuator as claimed in claim 1, wherein the principal surfaces of at least one of said first and said second transmission members is substantially perpendicular to a straight line passing through the fulcrum and the weight points of that one of said first and said second lever members to which said at least one of the first and the second lever members is attached.

4. A differential lever actuator as claimed in claim 3, said differential lever member being accompanied by a rod-shaped piece so that said rod-shaped piece is put into actuation by said linear displacement, wherein an axis of said rod-shaped piece passes substantially through a point of intersection of said first and said second transmission members.

5. A differential lever actuator as claimed in claim 3, said differential lever member being accompanied by a rod-shaped piece so that said rod-shaped piece is put into actuation by said linear displacement, wherein said differential lever member has a center of percussion related to a reaction applied thereto in response to said actuation with said center of percussion placed substantially at a center around which a line segment connecting said first and said second midpoints has a rotational component in response to said linear displacement.

6. A differential lever actuator as claimed in claim 5, wherein said differential lever member has a weight fixed to that tip end of said differential lever member which is remote from both of said first and said second predetermined points.

7. A differential lever actuator as claimed in claim 3, said differential lever member being accompanied by a rod-shaped piece so that said rod-shaped piece is put into actuation by said linear displacement, wherein at least one of said first and said second transmission members is thicker than 0.05 times a length between the weight and the predetermined points related to said at least one of the first and the second transmission members.

8. A differential lever actuator as claimed in claim 3, said differential lever member being accompanied by a rod-shaped piece so that said rod-shaped piece is put into actuation by said linear displacement, wherein at least one of said first and said second transmission members has a greater cross-sectional dimension at each of the weight and the predetermined points therefor than at the midpoint thereof.

9. A differential lever actuator as claimed in claim 3, said differential lever member being accompanied by a rod-shaped piece so that said rod-shaped piece is put into actuation by said linear displacement, wherein at least one of said first and said second transmission members has a greater cross-sectional dimension at the weight point therefor than at the predetermined point therefor.

10. A differential lever actuator as claimed in claim 1, wherein the principal surfaces of said first and said second transmission members are substantially perpendicular to first and second straight lines, respectively, said first and said second straight lines passing through said first fulcrum and weight points and through said second fulcrum and weight points, respectively.

11. A differential lever actuator as claimed in claim 10, said first and said second fulcrum points and said first and said second midpoints being on said reference plane, wherein distances between said first and said second fulcrum points, between said first fulcrum and weight points, and between said second fulcrum and weight points are substantially constant irrespective of said linear displacement.

12. A differential lever actuator as claimed in claim 11, wherein one of said first and said second midpoints is inside a triangle having vertices at said first and said second fulcrum points and the other of said first and said second midpoints.

* * * * *

UNITED STATES PATENT AND TRADEMARK OFFICE
CERTIFICATE OF CORRECTION

PATENT NO. : 4,518,887

DATED : May 21, 1985

INVENTOR(S) : Takeshi YANO, et al

It is certified that error appears in the above-identified patent and that said Letters Patent is hereby corrected as shown below:

Column 1, line 27, after "lever", delete the ",";

line 28, "from" should be --by--;

line 33, after "points" delete the ",";

line 40, before "second" insert --the--;

line 44, after "further" delete the ",";

line 46, after "is", delete "more remote" and insert --further--;

line 50, after "damage" delete the ",";

line 51, "many times" should be --a number of times--;

line 57, "wasteful" should be --worthless--;

line 58, after "of", insert --the--;

line 60, before "not", insert --does--;

UNITED STATES PATENT AND TRADEMARK OFFICE
CERTIFICATE OF CORRECTION

PATENT NO.   : 4,518,887

DATED        : May 21, 1985

INVENTOR(S) : Takeshi YANO, et al

It is certified that error appears in the above-identified patent and that said Letters Patent is hereby corrected as shown below:

Column 1, line 60, before "damage", "caused" should be --cause--;

line 61, after "member", delete the ",".

Column 2, line 3, "rarely" should be --scarcely--;

line 4, after "breaks" delete the ",";

line 11, after "which", delete "useless" and insert --meaningless--;

line 14, after "has", insert --an--;

line 23, "member" should be --members--.

Column 4, line 29, after "entirety", delete the ",";

line 32, after "33", delete the ",";

line 36, after "centrally", insert --thereof--;

line 53, after "plane", delete ", parallel to the first side surface of rectangle 25" and insert a --.--;

UNITED STATES PATENT AND TRADEMARK OFFICE
CERTIFICATE OF CORRECTION

PATENT NO. : 4,518,887

DATED : May 21, 1985

INVENTOR(S) : Takeshi YANO, et al

It is certified that error appears in the above-identified patent and that said Letters Patent is hereby corrected as shown below:

Column 4, line 68, delete "(P1 in FIG. 3)".

Column 5, line 6, change "A similar" to --Similar--;

line 14, before "second", insert --the--;

line 29, after "ment" and before the ".", insert --thereof--.

Column 6, line 3, after "surfaces" and before the "." insert --thereof--;

line 43, "reported" should be --regarded--;

line 61, "whether" should be --when--.

Column 9, line 8, before "second", insert --the--;

line 55, "connected" should be --connection--.

Column 10, line 12, "before" should be --heretobefore--;

line 45, "$x_7$", second occurrence, should read -- $y_7$ --.

UNITED STATES PATENT AND TRADEMARK OFFICE
CERTIFICATE OF CORRECTION

PATENT NO. : 4,518,887

DATED : May 21, 1985

INVENTOR(S) : Takeshi YANO, et al

It is certified that error appears in the above-identified patent and that said Letters Patent is hereby corrected as shown below:

Column 10, line 63, "<" should be -- = --.

Column 12, line 33, after "ment", insert --thereof--;

line 41, after "9", delete ", where" and insert --wherein--;

line 42, "a right angle" should be --right angles--;

line 44, after "illustrated", delete to line 45 ("slightly") and insert --with reference to thereof, are designed so that the bending stress little appears--;

line 52, after "stresses" and before the "." insert --therein--;

line 59, "resolved" should be --decomposed--.

Column 16, line 55, "$1_1/1_2$" should be --$\ell_1/\ell_2$--;

line 58, "$1_1$" should be --$\ell_1$--;

UNITED STATES PATENT AND TRADEMARK OFFICE
CERTIFICATE OF CORRECTION

PATENT NO. : 4,518,887

DATED : May 21, 1985

INVENTOR(S) : Takeshi YANO, et al

It is certified that error appears in the above-identified patent and that said Letters Patent is hereby corrected as shown below:

Column 16, line 60, "$1_1$" should be --$\ell_1$--.

Column 17, line 3, "is" should be --are--;

line 10, "being" should be --is--.

Signed and Sealed this

Twelfth Day of November 1985

[SEAL]

*Attest:*

*Attesting Officer*

DONALD J. QUIGG

*Commissioner of Patents and Trademarks*